United States Patent
Li

(10) Patent No.: US 12,549,989 B2
(45) Date of Patent: Feb. 10, 2026

(54) BEAM MEASUREMENT METHOD, BEAM MEASUREMENT APPARATUS, AND STORAGE MEDIUM

(71) Applicant: Beijing Xiaomi Mobile Software Co., Ltd., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 271 days.

(21) Appl. No.: 18/278,272

(22) PCT Filed: Feb. 22, 2021

(86) PCT No.: PCT/CN2021/077315
§ 371 (c)(1),
(2) Date: Aug. 22, 2023

(87) PCT Pub. No.: WO2022/174461
PCT Pub. Date: Aug. 25, 2022

(65) Prior Publication Data
US 2024/0007890 A1    Jan. 4, 2024

(51) Int. Cl.
*H04W 24/10* (2009.01)
*H04L 5/00* (2006.01)

(52) U.S. Cl.
CPC .......... *H04W 24/10* (2013.01); *H04L 5/0051* (2013.01)

(58) Field of Classification Search
CPC ................... H04W 24/10; H04L 5/0048–0051
(Continued)

(56) References Cited

U.S. PATENT DOCUMENTS

2017/0207845 A1   7/2017   Moon et al.
2019/0052341 A1   2/2019   Furuskog et al.
(Continued)

FOREIGN PATENT DOCUMENTS

CN    107889130 A    4/2018
CN    108632838 A    10/2018
(Continued)

OTHER PUBLICATIONS

State Intellectual Property Office of the People's Republic of China, Office Action and Search Report Issued in Application No. 2021800005605, Apr. 16, 2025, 16 pages.
(Continued)

*Primary Examiner* — Ayman A Abaza
(74) *Attorney, Agent, or Firm* — Volpe Koenig

(57) ABSTRACT

A beam measurement method includes: receiving first configuration information sent by a network device, wherein the first configuration information is used to configure a first reference signal resource set, and the first reference signal resource set includes a first number of reference signal resources for a beam measurement; performing the beam measurement on the first number of reference signal resources separately; inputting a first number of reference signal resource measurement results that are measured and obtained into a first model to obtain a second number of reference signal resource measurement results, wherein the second number is greater than or equal to the first number; and sending a measurement report including a third number of reference signal resource measurement results to the network device, wherein the third number of reference signal resource measurement results are a subset of the second number of reference signal resource measurement results.

20 Claims, 7 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0223043 | A1 | 7/2019 | Geng et al. |
| 2020/0014428 | A1 | 1/2020 | Chen et al. |
| 2020/0328780 | A1 | 10/2020 | Chen et al. |
| 2021/0099992 | A1* | 4/2021 | Mao ..................... H04L 5/0051 |
| 2021/0243637 | A1* | 8/2021 | Geng .................. H04W 72/046 |

FOREIGN PATENT DOCUMENTS

| | | |
|---|---|---|
| CN | 110419174 A | 11/2019 |
| CN | 110463061 A | 11/2019 |
| CN | 110912665 A | 3/2020 |
| CN | 111954228 A | 11/2020 |
| CN | 112369070 A | 2/2021 |
| IN | 201947015610 A | 9/2019 |
| WO | 2019064270 A1 | 4/2019 |
| WO | 2019161546 A1 | 8/2019 |
| WO | 2020159597 A1 | 8/2020 |
| WO | 2020187135 A1 | 9/2020 |
| WO | 2020213964 A1 | 10/2020 |

OTHER PUBLICATIONS

European Patent Office, Extended European Search Report Issued in Application No. 21926178.1, Dec. 3, 2024, Germany, 15 pages.

State Intellectual Property Office of the People's Republic of China, Office Action and Search Report Issued in Application No. 2021800005605, Oct. 15, 2024, 13 pages.

Huawei, HiSilicon, "Introduction of Bluetooth and WLAN measurement collection in MDT", R2-1808795, 3GPP TSG-RAN WG2 meeting #102, Busan, Korea, May 21-25, 2018, 98 pages.

Huawei, HiSilicon, "Introduction of Bluetooth and WLAN measurement collection in MDT", R2-1808396, 3GPP TSG-RAN WG2 meeting #102, Busan, Korea, May 21-25, 2018, 96 pages.

ISA State Intellectual Property Office of the People's Republic of China, Written Opinion of the International Searching Authority Issued in Application No. PCT/CN2021/077315, Nov. 23, 2021, WIPO, 6 pages.

ISA State Intellectual Property Office of the People's Republic of China, International Search Report Issued in Application No. PCT/CN2021/077315, Nov. 23, 2021, WIPO, 4 pages.

Huawei et al. "Beam measurement, reporting and indication"3GPP TSG RAN WG1 Meeting #91 R1-1719422,Dec. 1, 2017(Dec. 1, 2017), 11 pages.

* cited by examiner

Second Stage

BEAM MEASUREMENT METHOD, BEAM MEASUREMENT APPARATUS, AND STORAGE MEDIUM

CROSS-REFERENCE TO RELATED APPLICATION

This application is the U.S. national phase application of International Application No. PCT/CN2021/077315, filed on Feb. 22, 2021, the disclosure of which is incorporated herein by reference in its entirety for all purposes.

TECHNICAL FIELD

The present disclosure relates to the field of communication technologies, and in particular, to beam measurement methods, beam measurement apparatuses, and storage media.

BACKGROUND

In new radio (NR) technologies, beam-based transmission and reception are expected to be applied due to rapid high-frequency channel attenuation when, for example, frequency range 2 (FR2) is used as a communication frequency band, so as to ensure coverage.

During a beam management process in related arts, a network device is to configure a reference signal resource set for a beam measurement, and a terminal measures the reference signal resources in the reference signal resource set, and then reports identifiers (IDs) of an positive integer number of reference signal resources with relatively strong reference signal receiving power (RSRP) and/or signal interference noise ratio (SINR) and reports corresponding Layer 1-RSRP (L1-RSRP) and/or Layer 1-SINR (L1-SINR). The reference signals included in the reference signal resource set configured by the network device are usually sent periodically, i.e., the reference signal resources of the same number and the same beam direction are sent each time. Therefore, the beam obtained by the terminal measurement is not accurate enough when there are too few reference signal resources in the reference signal resource set, while the overhead on the reference signal resources is relatively large and the complexity and power consumption of the terminal measurement are also relatively high when there are too many reference signal resources in the reference signal resource set.

SUMMARY

In view of the above, the present disclosure provides a beam measurement method, a beam measurement apparatus and a storage medium.

According to a first aspect of the present disclosure, a beam measurement method is provided, performed by a terminal device, and including: receiving first configuration information sent by a network device, wherein the first configuration information is used to configure a first reference signal resource set, and the first reference signal resource set includes a first number of reference signal resources for a beam measurement; performing the beam measurement on each of the first number of reference signal resources separately; inputting a first number of reference signal resource measurement results that are measured and obtained into a first model to obtain a second number of reference signal resource measurement results, wherein the second number is greater than or equal to the first number; sending a measurement report including a third number of reference signal resource measurement results to the network device, wherein the third number of reference signal resource measurement results are a subset of the second number of reference signal resource measurement results.

According to a second aspect of the present disclosure, a beam measurement method is provided, performed by a network device, and including: sending first configuration information, wherein the first configuration information is used to configure a first reference signal resource set, and the first reference signal resource set includes a first number of reference signal resources for a beam measurement; receiving a measurement report from a terminal device, wherein the measurement report includes a third number of reference signal resource measurement results, and the third number of reference signal resource measurement results are a subset of a second number of reference signal resource measurement results; wherein the second number is greater than or equal to the first number, and the first number indicates the number of the reference signal resources in the first reference signal resource set.

According to a third aspect of the present disclosure, a beam measurement apparatus is provided, including: one or more processors; and one or more memories for storing instructions executable by the one or more processors; wherein the one or more processors are configured to perform: receiving first configuration information sent by a network device, wherein the first configuration information is used to configure a first reference signal resource set, and the first reference signal resource set includes a first number of reference signal resources for a beam measurement; performing the beam measurement on each of the first number of reference signal resources separately; inputting a first number of reference signal resource measurement results that are measured and obtained into a first model to obtain a second number of reference signal resource measurement results, wherein the second number is greater than or equal to the first number; sending a measurement report including a third number of reference signal resource measurement results to the network device, wherein the third number of reference signal resource measurement results are a subset of the second number of reference signal resource measurement results.

It should be understood that the above general description and the following detailed description are only illustrative and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
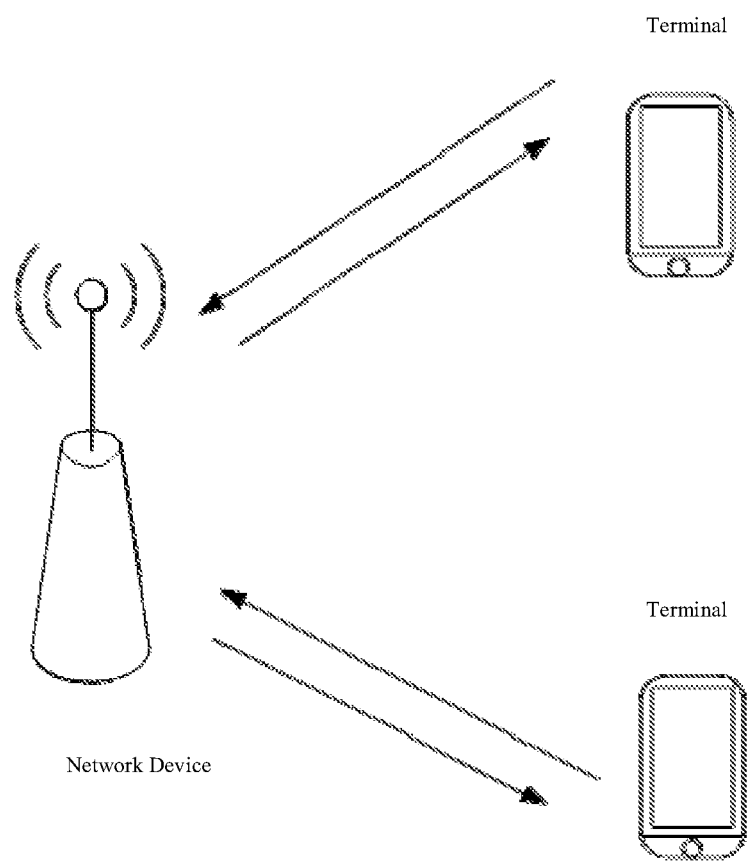
FIG. 1 illustrates a schematic diagram of a wireless communication system according to an example.

Embodiments will be described in detail here with the examples thereof illustrated in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The beam measurement method provided by the examples of the present disclosure may be applied to a wireless communication system illustrated in FIG. 1. By referring to FIG. 1, the wireless communication system includes terminals and a network device. The terminals are connected to the network device through wireless resources, and perform data transmissions and receptions.

It can be understood that the communication system illustrated in FIG. 1 is only a schematic illustration. The wireless communication system may further include other network device(s), such as core network device(s), wireless relay device(s), and wireless backhaul device(s), which are not illustrated in FIG. 1. The examples of the present disclosure have no limits for the number of the network devices and the number of the terminals included in the wireless communication system.

It can be further understood that the wireless communication system in the examples of the present disclosure is a network that provides a wireless communication function. The wireless communication system may be based on different communication technologies, such as code division multiple access (CDMA), wideband code division multiple access (WCDMA), time division multiple access (TDMA), frequency division multiple access FDMA), orthogonal frequency division multiple access (OFDMA), single carrier frequency division multiple access (SC-FDMA), and carrier sense multiple access with collision avoidance. According to the factors such as capacity, speed and latency in different networks, a network may be classed into a 2nd generation (2G) network, a 3G network, a 4G network or a future evolution network, such as a 5G network that is called a new radio (NR) network. For convenience of description, the present disclosure sometimes refers to the wireless communication network as a network for short.

Further, the network device involved in the present disclosure may also be referred to as a radio access network device. The wireless access network device may be a base station, an evolved node B (eNB), a femtocell, an access point (AP) in a wireless fidelity (WiFi) system, a wireless relay node, a wireless backhaul node, a transmission point (TP) or a transmission and reception point (TRP), etc., or may be a gNodeB (gNB) in an NR system. Alternatively, the wireless access network device may be a device that constitutes a component or a part of the base station. In a vehicle-to-everything (V2X) communication system, the network device may be an in-vehicle device. It can be understood that, the examples of the present disclosure have no limits for the specific technology adopted by the network device or the specific device form of the network device.

Further, the terminal involved in the present disclosure, as a device that provides voice and/or data connectivity for a user, may also be referred to as a terminal device, user equipment (UE), a mobile station (MS), a mobile terminal (MT), etc. For example, the terminal may be a handheld device, an in-vehicle device, or the like which is equipped with a wireless connection function. At present, some examples of the terminal include a mobile phone, a pocket personal computer (PPC), a handheld computer, a personal digital assistant (PDA), a notebook computer, a tablet computer, a wearable device, an in-vehicle device, or the like. In a V2X communication system, the terminal device may be an in-vehicle device. It can be understood that, the examples of the present disclosure have no limits for the specific technology adopted by the terminal or the specific device form of the terminal.

In the present disclosure, a beam-based data transmission is performed between the network device and the terminal. A beam management is expected in a process of the beam-based data transmission between the network device and the terminal. In the beam management process in related arts, the network device such as the base station is to configure a reference signal resource set for a beam measurement, and the terminal measures reference signal resources in the reference signal resource set and then reports identifiers (IDs) of X relatively strong reference signal resources and corresponding Layer 1-reference signal receiving power (L1-RSRP) and/or Layer 1-signal interference noise ratio (L1-SINR). The reference signals included in the reference signal resource set configured by the network device are usually periodic, i.e., the reference signal resources of the same number and the same beam direction are sent each time. The beam obtained by the terminal measurement is not accurate enough when these reference signal resources are too few, while the overhead on the reference signal resources is relatively large and the complexity and power consumption of the terminal measurement are also relatively high when there are too many reference signal resources.

In the related art, since feedback information from the terminal is not taken into consideration when the network device configures the reference signal resources for the terminal for the beam measurement, it results in large signaling overhead and high terminal measurement complexity when there are too many reference signal resources, or inaccurate measurement results when there are too few reference signal resources.

In view of these, the examples of the present disclosure provide a beam measurement scheme. In the beam measurement scheme, the reference signal resources for the beam measurement are configured based on reference signal resources for the beam measurement that are fed back by the terminal. In particular, the terminal estimates, by using the actual measurement results of a small number of reference signal resources and a model, beam measurement results of other reference signal resources based on the model, and feeds back reference signal resource information of the small number of reference signal resources corresponding to the actual measurement results to the network device, and the network device configures reference signal resources corresponding to the beam measurement results of the measured reference signal resources for the beam measurement. According to this scheme, it can lower the signaling overhead for the beam measurement on the reference signal resources and reduce the complexity of terminal measurement while ensuring the beam measurement accuracy.

Figure 2:
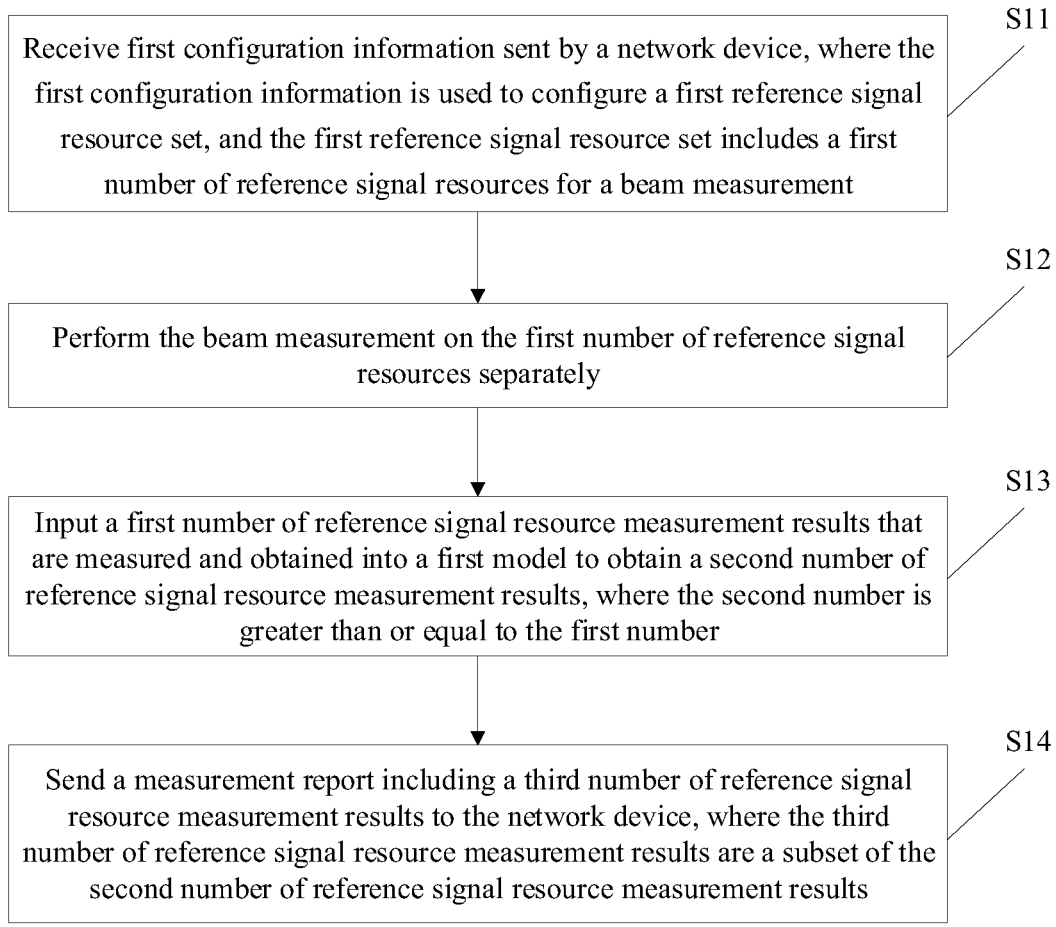
FIG. 2 illustrates a flowchart of a beam measurement method according to an example.

FIG. 2 illustrates a flowchart of a beam measurement method according to an example. As illustrated in FIG. 2, the beam measurement method is applied in a terminal and includes the following steps S11-S14.

At step S11, first configuration information sent by a network device is received. The first configuration information is used to configure a first reference signal resource set. The reference signal resources in the first reference signal resource set are used for a beam measurement, and there are a first number of reference signal resources in the first reference signal resource set.

At step S12, the beam measurement is performed on the first number of reference signal resources separately.

At step S13, a first number of reference signal resource measurement results that are measured and obtained are inputted into a first model to obtain a second number of reference signal resource measurement results, where the second number is greater than or equal to the first number.

At step S14, a measurement report including a third number of reference signal resource measurement results is sent to the network device.

The third number of reference signal resource measurement results are a subset of the second number of reference signal resource measurement results.

In the beam measurement method provided by the example of the present disclosure, the terminal receives the first configuration information sent by the network device, measures the first number of reference signal resources of the first reference signal resource set in the first configuration information, inputs the measurement results of the measured reference signal resources into the first model, and obtains the greater than or equal to the first number (the second number) of measurement results corresponding to the reference signal resources. Based on the second number of reference signal resource measurement results, the terminal feeds back the reference signal resource measurement results with the strongest signal strength among the second number of reference signal resource measurement results to the network device. The reference signal resource measurement results with the strongest signal strength among the second number of reference signal resource measurement results are of the third number.

In the beam measurement method provided by the example of the present disclosure, the reference signal resources among the first number of reference signal resources may or may not be included in a second number of reference signal resources.

In the beam measurement method provided by the example of the present disclosure, the third number of reference signal resource measurement results are a subset of the second number of reference signal resource measurement results.

In the beam measurement method provided by the example of the present disclosure, the third number of reference signal resource measurement results fed back by the terminal may be included in the measurement report sent by the terminal to the network device, that is, the measurement report includes the third number of reference signal resource measurement results.

In the beam measurement method provided by the example of the present disclosure, the measurement report sent by the terminal to the network device may further include information corresponding to the reference signal resources. For example, the information corresponding to the reference signal resources may be identification information corresponding to the reference signal resources.

In the example of the present disclosure, the first number of reference signal resources are measured and the first number of reference signal resource measurement results are inputted into the first model to obtain the second number of reference signal resource measurement results, so as to achieve that a large number of reference signal resource measurement results are estimated based on the measurement results of a small number of measured reference signal resources. Taking 1 to 8 beams in total as an example, it may be possible that only Beam 2 and Beam 5 thereof need to be measured and then the other 6 beams can be inferred through the model. Alternatively, two beams, Beam 9 and Beam 10, are measured. At least one of Beam 9 and Beam 10 has a different direction from Beams 1 to 8, e.g., the beam direction of Beam 9 includes the directions covered by two of Beams 1 to 8. Based on the measurement results of Beam 9 and Beam 10, the measurement results of Beams 1 to 8 are inferred through the model.

Further, the terminal may send the third number of reference signal resource measurement results to the network device. The third number of reference signal resource measurement results are selected from the second number of reference signal resource measurement results according to signal strengths corresponding to these measurement results in a descending order. Taking 1 to 8 beams in total as an example, it may be possible that only Beam 2 and Beam 5 thereof need to be measured and then the other 6 beams can be inferred through the model. The beam measurement results finally reported are Beam 3 and Beam 4 whose measurement results own the strongest signal strengths.

The signal strength corresponding to a measurement result may include L1-RSRP, L1-SINR, Layer 1-reference signal received quality (L1-RSRQ), or the like.

In the beam measurement method provided by the example of the present disclosure, the first configuration information sent by the network device may be determined according to the first number of reference signal resources. Taking 1 to 8 beams in total as an example, it may be possible that only Beam 2 and Beam 5 thereof need to be measured and then the other 6 beams can be inferred through the model. The beam measurement results finally reported are Beam 3 and Beam 4 whose measurement results own the strongest signal strengths, and the terminal recommends Beam 2 and Beam 5 as the small number of reference signal resources sent subsequently by the network device. That is, the network device may configure the first configuration information based on Beam 2 and Beam 5, and the network device sends Beam 2 and Beam 5.

In the beam measurement method provided by the example of the present disclosure, the terminal may determine the number of the reference signal resource measurement results inferred through the model according to the configuration information sent by the network device.

Figure 3:
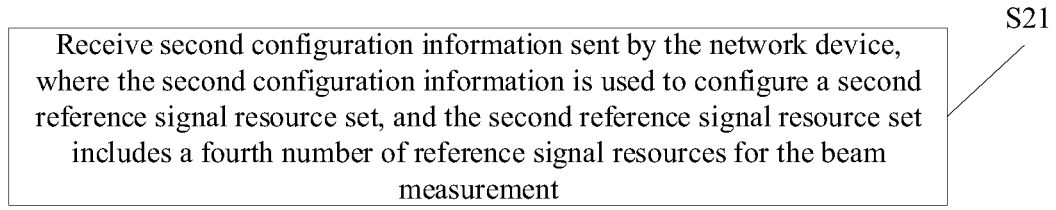
FIG. 3 illustrates a flowchart of a beam measurement method according to an example.

FIG. 3 illustrates a flowchart of a beam measurement method according to an example. As illustrated in FIG. 3, the beam measurement method is applied in the terminal and includes the following step S21.

At step S21, second configuration information sent by the network device is received.

The second configuration information is used to configure a second reference signal resource set. The reference signal resources in the second reference signal resource set are used for the beam measurement, and there are a fourth number of reference signal resources in the second reference signal resource set.

In the beam measurement method provided by the example of the present disclosure, the terminal may determine the second number based on the fourth number. In an implementation, the fourth number is identical with the second number. The reference signal resource measurement results of the second number correspond to various reference signal resources in the second reference signal resource set, respectively.

In the beam measurement method provided by the example of the present disclosure, the terminal may recommend the small number of reference signal resources sent subsequently by the network device. The small number of reference signal resources may be used to determine the first reference signal resource set in the first configuration information.

Figure 4:
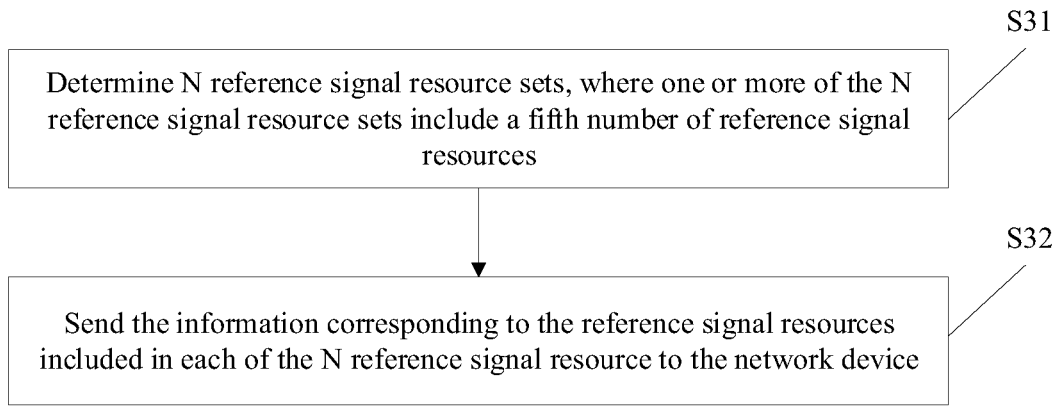
FIG. 4 illustrates a flowchart of a beam measurement method according to an example.

FIG. 4 illustrates a flowchart of a beam measurement method according to an example. As illustrated in FIG. 4, the beam measurement method is applied in the terminal and includes the following steps S31 and S32.

At step S31, N reference signal resource sets are determined. One or more of the N reference signal resource sets include a fifth number of reference signal resources.

N is a positive integer.

At step S32, the information corresponding to the reference signal resources included in each of the N reference signal resource sets is sent to the network device.

In an implementation, the N reference signal resource sets are used to determine the first reference signal resource set in the first configuration information.

In an implementation, the first reference signal resource set is a subset of at least one of the N reference signal resource sets.

In the example of the present disclosure, the N reference signal resource sets may be determined based on configuration information sent by the network device. For example, the terminal determines the N reference signal resource sets based on second configuration information including a second reference signal resource set. In an implementation, the N reference signal resource sets are subsets of the second reference signal resource set.

In an example, the terminal measures the reference signals in the second reference signal resource set, and trains to obtain the first model for beam management. The input of the first model is the beam measurement results of the fifth number of reference signal resources, and the output is the measurement results of a fourth number of reference signal resources. The fifth number is smaller than the fourth number, and the fifth number of reference signal resources are the reference signal resources of the fifth number in the second reference signal resource set.

In the beam measurement method provided by the example of the present disclosure, the fifth number of reference signal resources included in the N reference signal resource sets may be regarded as the small number of reference signal resources recommended by the terminal to the network device to be subsequently sent.

In the beam measurement method provided by the example of the present disclosure, the fifth number of reference signal resources may be determined based on the first model.

In an implementation, one or more reference signal resource sets with a smallest number of reference signal resources among the N reference signal resource sets include the fifth number of reference signal resources. The reference signal resource measurement results of the second number obtained by inputting a fifth number of reference signal resource measurement results into the first model have a precision greater than or equal to a first precision threshold.

In the beam measurement method provided by the example of the present disclosure, the terminal determines the fifth number of reference signal resources through the first model. When the fifth number of reference signal resource measurement results are taken as the input of the first model, the precision of the outputted reference signal resource measurement results of the second number is greater than the first precision threshold.

In an implementation, the precision of the reference signal resource measurement results of the second number outputted by the first model is determined by the differences between the estimated measurement results and the actual measurement results, that is, the differences between the estimated reference signal resource measurement results of the second number outputted by the first model and the actual reference signal resource measurement results of the second number. It may adopt the calculation approach as: making differences between the estimated reference signal resource measurement results of the second number outputted by the first model and the actual reference signal resource measurement results of the second number, respectively, squaring each difference, and taking an evaluation precision value obtained by averaging all the difference squares as the precision of the reference signal resource measurement results of the second number. Of course, the example of the present disclosure does not limit the approach for calculating the precision of the reference signal resource measurement results of the second number outputted by the first model, which may include calculation approaches other than the above-mentioned calculation approach.

In the beam measurement method provided by the example of the present disclosure, the fifth number of reference signal resources are determined in at least one of the following ways.

In the first way, it is determined based on the precision of the reference signal resource measurement results outputted by the first model.

In the second way, it is determined based on configuration information sent by the network device.

In the third way, it is determined based on a protocol.

It can be understood that, in the example of the present disclosure, there may be various implementation manners for determining the fifth quantity of reference signal resources based on the foregoing ways. As an example, it may determine the fifth number based on the configuration information or the definition of the protocol, and further determine the fifth number of reference signal resources based on the first model.

As an example, in the case where the value of the fifth number is configured by the network device or defined by the protocol, the terminal has learned the value of the fifth number. Thus, the terminal selects arbitrary reference signal resources of the fifth number from the second number of reference signal resources, and input the measurement results of the fifth number of reference signal resources into the first model. When the precision of the outputted reference signal resource measurement results of the second number is greater than the first precision threshold, the identifiers of the fifth number of reference signal resources are determined.

As another example, in the case where the value of the fifth number is determined by the terminal, the terminal may start from the fifth number=1, select and input arbitrary reference signal resource measurement results of the fifth number into the first model, and determine whether the precision of the outputted reference signal resource measurement results of the second number is greater than the first precision threshold. When the precision of the reference signal resource measurement results of the second number is greater than the first precision threshold, the identifiers of the fifth number of reference signal resources are determined.

As another example, the fifth number of reference signal resources is given based on the configuration information from the network device. For example, the network device gives the identification information of the fifth number of reference signal resources.

In the beam measurement method provided by the example of the present disclosure, the network device may send the second configuration information once, and then periodically send the reference signal resources in the second reference signal resource set. Alternatively, the network device may send the reference signal resources in the second reference signal resource set periodically or aperiodically in accordance with the configured time.

In an implementation of the beam measurement method provided by the example of the present disclosure, the terminal receives the reference signal resources in the second reference signal resource set sent by the network device, and determines the N reference signal resource sets based on the received reference signal resources in the second reference signal resource set.

With respect to the first configuration information, only when the reference signal resources in the N reference signal resource sets have changed from before, the terminal is expected to provide a report and the first configuration information is expected to be sent by the network device to update the first reference signal resource set.

In an implementation, the terminal may receive the reference signal resources in the second reference signal resource set that are periodically sent by the network device within sending periods of the first reference signal resource set.

In different periods of the first reference signal resource set, the second reference signal resource set may be different.

The first model involved in the examples of the present disclosure may be an artificial intelligence (AI) model. The first model may be used for a beam management.

In an implementation, the first model involved in the examples of the present disclosure may be pre-trained.

In an example of the beam measurement method provided by the examples of the present disclosure, the fourth number of reference signal resources included in the second reference signal resource set may also be used to determine the first model. The first model is pre-trained based on the fourth number of reference signal resources included in the second reference signal resource set.

Figure 5:
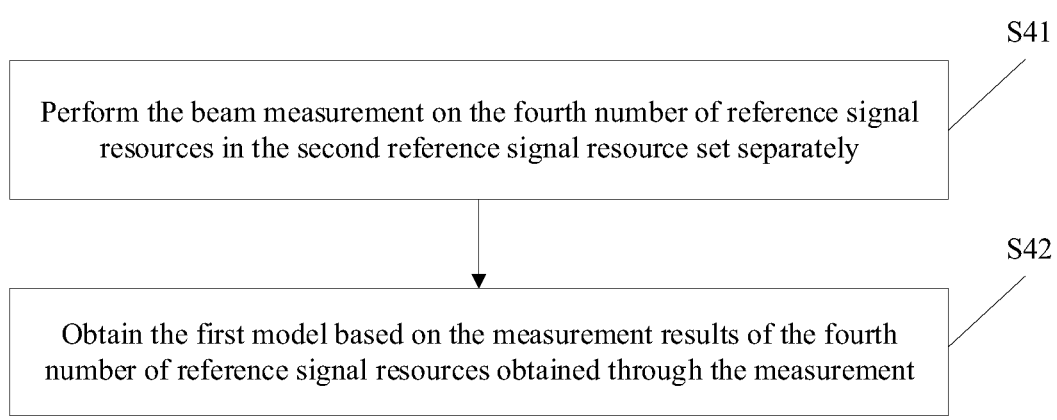
FIG. 5 illustrates a method flowchart of determining a first model according to an example.

FIG. 5 illustrates a flowchart of a method for determining a first model according to an example. As illustrated in FIG. 5, the method for determining the first model includes the following steps S41 and S42.

At step S41, the beam measurement is performed on the fourth number of reference signal resources in the second reference signal resource set separately.

At step S42, the first model is obtained based on the measurement results of the fourth number of reference signal resources obtained through the measurement.

In another implementation, the terminal may obtain the first model from another device. In an example, the first model is obtained from at least one of the following device: the network device; a cloud device; or a terminal device different from the terminal device.

In the beam measurement method provided by the examples of the present disclosure, the first reference signal resource set and the second reference signal resource set may include a first stage and a second stage.

Figure 6:
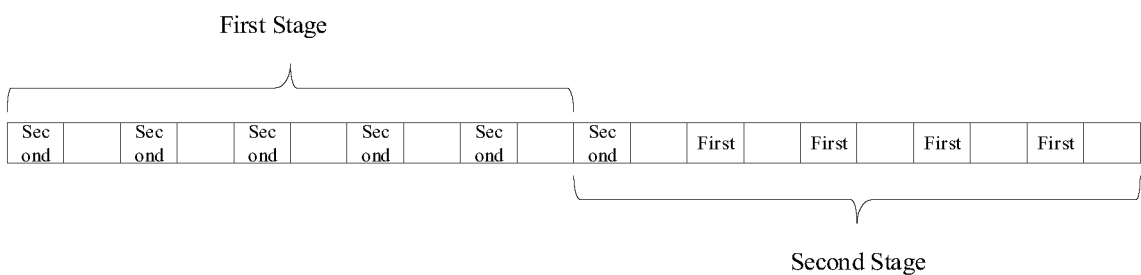
FIG. 6 illustrates a schematic diagram of receiving a first reference signal resource set and a second reference signal resource set by a terminal according to an example of the present disclosure.

FIG. 6 illustrates a schematic diagram of receiving a first reference signal resource set and a second reference signal resource set by a terminal in an example of the present disclosure. By referring to FIG. 6, it includes the first stage and the second stage during receiving the first reference signal resource set and the second reference signal resource set by the terminal. In the first stage, the terminal trains and obtains the first model for the beam management. The duration of the first stage may have various possibilities, which may be very long, may be short, or may be almost zero (e.g., in the case where the terminal directly downloads the first model from the network device, a cloud terminal or another terminal).

In the first stage illustrated in FIG. 6, the network device mainly sends the reference signal resources in the second reference signal resource set, that is, the network device sends reference signal resources of a large number for the beam measurement. However, the specific sending period, 2 slots, 4 slots, 8 slots or otherwise, is not limited by the example of the present disclosure that only provides an illustration.

In the second stage illustrated in FIG. 6, the second stage may include K sending occasions for sending the reference signal resources, in which the reference signal resources in the second reference signal resource set are sent in only the first sending occasion, while the reference signal resources in the first reference signal resource set are sent in all the subsequent sending occasions. Of course, it is also possible that the reference signal resources in the second reference signal resource set are sent in the first and the second ones of the K sending occasions, while the reference signal resources in the first reference signal resource set are sent in the subsequent ones. The reference signal resources in the second reference signal resource set are sent in the first z ones of the K sending occasions, and z is an integer greater than or equal to 1. The value of z mainly depends on a time sum that the terminal determines X reference signal resources based on the measurement results of the reference signal resources in the second reference signal resource set in the first sending occasion, the terminal feeds back the identifiers of the X reference signal resources, and the network device sends the first configuration information again. The X reference signal resources are used for the network device to configure the first reference signal resource set.

Figure 7:
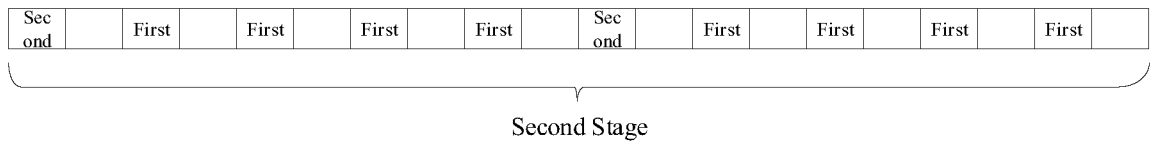
FIG. 7 illustrates a schematic diagram of receiving a first reference signal resource set and a second reference signal resource set by a terminal according to an example of the present disclosure.

FIG. 7 illustrates a schematic diagram of receiving a first reference signal resource set and a second reference signal resource set in an example of the present disclosure. By referring to FIG. 7, after the first model is obtained, it takes the K sending occasions as a period. In one period, the reference signal resources in the second reference signal resource set are sent in the first sending occasion or in the first z sending occasions, while the reference signal resources in the first reference signal resource set are sent in the subsequent ones, so as to lower the signaling overhead and reduce the complexity of the terminal measurement. By further referring to FIG. 7, after the first reference signal resource set is periodically received for a period of time, the second reference signal resource set may be received again, which facilitates updating the first model of the terminal, and/or updating the first reference signal resource set. That is, in the next period, the terminal may receive the second reference signal resource set again in the first z ones of the K sending occasions, and re-determine X reference signal resources based on the reference signal resources in the second reference signal resource set for the network device to update the first reference signal resource set. There are different ways for triggering and reporting the X reference signal resources. It may be triggered and reported per the period, or be triggered and reported only when the determined X reference signal resources are different from the ones determined previously, which is not limited here.

As proposed by the beam measurement method provided by the examples of the present disclosure, two reference signal resource sets with different configurations are sent alternately, so as to lower the signaling overhead on the reference signal resources for the beam management. In order to better configure the reference signal resources of the small number in the first reference signal resource set, the terminal is expected to determine which reference signal resources to be selected as the reference signal resources in the first reference signal resource set based on the first model for the beam management, and report them to the network device, thereby lowering the signaling overhead while ensuring the accuracy of the beam measurement results.

Figure 8:
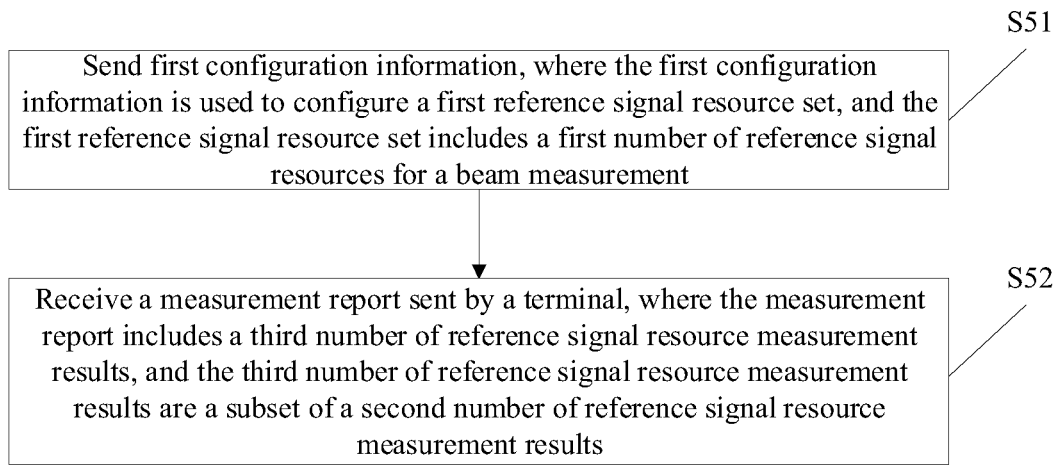
FIG. 8 illustrates a flowchart of a beam measurement method according to an example of the present disclosure.

FIG. 8 illustrates a flowchart of a beam measurement method in an example of the present disclosure. By referring to FIG. 8, the beam measurement method is applied to a network device and includes the following steps S51 and S52.

At step S51, first configuration information is sent. The first configuration information is used to configure a first reference signal resource set, reference signal resources in the first reference signal resource set are used for a beam measurement, and there are a first number of reference signal resources in the first reference signal resource set.

In the beam measurement method provided by the example of the present disclosure, the reference signal resources among the first number of reference signal resources may or may not be included in the second number of reference signal resources.

At step S52, a measurement report sent by a terminal is received. The measurement report includes a third number of reference signal resource measurement results, and the third number of reference signal resource measurement results are a subset of a second number of reference signal resource measurement results.

The second number of reference signal resource measurement results are obtained by performing by the terminal the beam measurement on the first number of reference signal resources separately and inputting the first number of reference signal resource measurement results that are measured and obtained into a first model. The second number is greater than or equal to the first number.

In an implementation, the first model is obtained based on a fourth number of reference signal resource measurement results that are measured and obtained by performing by the terminal the beam measurement on the fourth number of reference signal resources in the second reference signal resource set separately.

In an implementation, the first model is obtained by the terminal from another device, and the another device includes at least one of or a combination of: the network device, a cloud device, or a terminal other than the terminal.

In an implementation, the third number of reference signal resource measurement results are selected from the second number of reference signal resource measurement results according to signal strengths corresponding to measurement results in a descending order.

Figure 9:
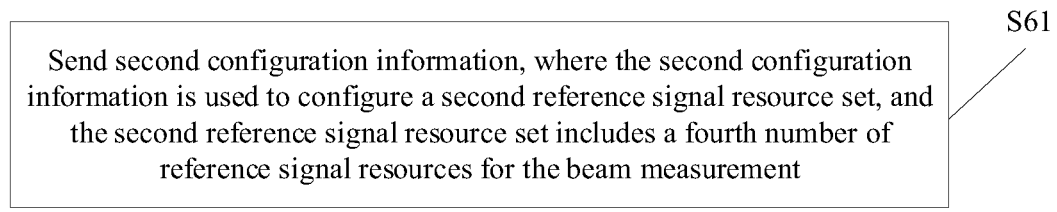
FIG. 9 illustrates a flowchart of a beam measurement method according to an example of the present disclosure.

FIG. 9 illustrates a flowchart of a beam measurement method in an example of the present disclosure. By referring to FIG. 9, the beam measurement method applied to the network device and includes the following step S61.

At step S61, second configuration information is sent. The second configuration information is used to configure a second reference signal resource set, the reference signal resources in the second reference signal resource set are used for the beam measurement, and there are a fourth number of reference signal resources in the second reference signal resource set.

Figure 10:
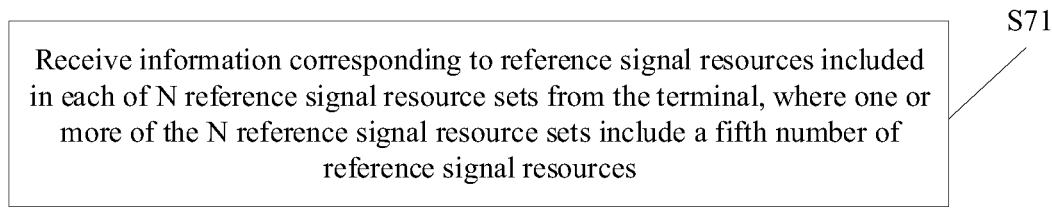
FIG. 10 illustrates a flowchart of a beam measurement method according to an example of the present disclosure.

FIG. 10 illustrates a flowchart of a beam measurement method in an example of the present disclosure. By referring to FIG. 10, the beam measurement method applied to the network device and includes the following step S71.

At step S71, information corresponding to reference signal resources included in each of N reference signal resource sets is received from the terminal. One or more of the N reference signal resource sets include a fifth number of reference signal resources. Here, N is a positive integer.

In an implementation, the N reference signal resource sets are used to determine the first reference signal resource set in the first configuration information.

In an implementation, the first reference signal resource set is a subset of at least one of the N reference signal resource sets.

In an implementation, one or more reference signal resource sets with a smallest number of reference signal resources among the N reference signal resource sets include the fifth number of reference signal resources. The fifth number meets a condition that reference signal resource measurement results of the second number obtained by inputting a fifth number of reference signal resource measurement results into the first model have a precision greater than or equal to a first precision threshold.

The fifth number of reference signal resources are given based on configuration information from the network device. For example, the network device gives the identification information of the fifth number of reference signal resources.

In an implementation, the fifth number of reference signal resources are determined in at least one of the following ways: being determined based on the precision of the reference signal resource measurement results outputted by the first model; being determined based on the configuration information sent by the network device; or being determined based on a definition of a protocol.

In an implementation, the N reference signal resource sets are subsets of the second reference signal resource set.

In an implementation, the fourth number is identical with the second number, and the reference signal resource measurement results of the second number correspond to various reference signal resources in the second reference signal resource set, respectively.

In an implementation of the beam measurement method provided by the example of the present disclosure, the network device may send the second configuration information once, and then periodically send the second reference signal resource set. That is, the network device periodically sends the reference signal resources in the second reference signal resource set. Alternatively, the network device may send the reference signal resources in the second reference signal resource set periodically or aperiodically in accordance with the configured time.

With respect to the first configuration information, only when the reference signal resources in the N reference signal resource sets have changed from before, the terminal is expected to provide a report and the first configuration information is expected to be sent by the network device to update the first reference signal resource set.

In an implementation, the network device may send periodically the reference signal resources in the second reference signal resource set within sending periods of the first reference signal resource set.

In different periods of the first reference signal resource set, the second reference signal resource set may be different.

It can be understood that the implementation process of the beam measurement performed by the network device in the examples of the present disclosure may be similar to the implementation process of the beam measurement performed by the terminal. Therefore, for any part in the beam measurement methods performed by the network device that is not described in detail may refer to the beam measurement methods performed by the terminal, which will not be repeated here.

The beam measurement methods involved in the foregoing examples are described in an example of the present disclosure below in combination with a practical application.

In the following example of the present disclosure, the first number is represented by L, the second number and the fourth number are the same and are represented by M, the third number is represented by Y, and the fifth number is represented by X.

The terminal receives the second configuration information sent by the network device. The second configuration information is used to configure the second reference signal resource set, and the reference signal resources in the second reference signal resource set are used for the beam measurement. The second reference signal resource set includes M reference signal resources.

The terminal determines X reference signal resources, and feeds back the identifiers of the X reference signal resources to the network device.

The X reference signal resources are used for the network device to send the first configuration information. The first configuration information is used to configure the first reference signal resource set, and the reference signal resources in the first reference signal resource set are also used for the beam measurement. The first reference signal resource set includes L reference signal resources, where L is less than M.

In a typical situation, the L reference signal resources in the first reference signal resource set are the same as the X reference signal resources.

In this example of the present disclosure, the terminal determines the X reference signal resources in the following ways.

In the first way, the terminal measures the reference signals in the second reference signal resource set, and trains to obtain a beam management model. The input of the beam management model is the beam measurement results of the X reference signal resources, and the output is the measurement results of M reference signal resources. Here, X is less than M, and the X reference signal resources are X reference signal resources in the second reference signal resource set.

In the second way, the terminal determines the X reference signal resources through an AI model. When the X reference signal resources are used as the input of the beam management model, the precision of the outputted beam measurement results of M reference signal resources is greater than the first precision threshold.

The calculating approach of the precision may include: making the differences between the beam measurement results of the M reference signal resources outputted by the beam management model and the actual measurement results of the M reference signal resources, respectively, squaring each difference, and then averaging the various difference squares to obtain and compare an evaluation value of the precision with the first threshold.

The determination of the X reference signal resources.

The value of X may be configured by the network device, or be defined by the protocol, or be determined by the terminal wholly by comparing the precision with the first threshold.

For example, in the case where the value of X is configured by the network device or defined by the protocol, the terminal has learned the value of X, and thus selects arbitrary X reference signal resources from the M reference signal resources, inputs the measurement results of the arbitrary X reference signal resources into the beam management model, and determines the identifiers of the X reference signal resources if the precision of the outputted measurement results of the M reference signal resources is greater than the first threshold.

For example, in the case where the value of X is determined by the terminal, the terminal may start from X=1, select and input the measurement results of arbitrary X reference signal resources into the beam management model, determine whether the precision of the outputted measurement results of M reference signal resources is greater than the first threshold, and determine the identifiers of the X reference signal resources if greater than.

The terminal receives the first configuration information sent by the network device, measures the reference signal resources of the first reference signal resource set in the first configuration information, inputs the measurement result of the measured reference signal resources into the model, obtains M reference signal resource measurement results, and feeds back the identifiers and the measurement results of Y strongest reference signal resources.

Subsequently, the reference signal resources in the second reference signal resource set are also periodically sent to the terminal for updating the X reference signal resources, that is, for the network device to update the reference signal resources in the first reference signal resource set.

It can be further understood that the beam measurement methods provided by the examples of the present disclosure is applicable to implementing the beam measurement by interacting between the terminal and the network device. In the process of implementing the beam measurement by interacting between the terminal and the network device, where the terminal has the terminal's functions involved in implementing the above examples, and the network device has the network device's functions involved in implementing the above examples. The details may refer to the relevant description of the above examples and are not repeated here.

It should be noted that as those skilled in the art can understand, the various implementations/examples involved in the above examples of the present disclosure may be used in conjunction with the foregoing examples, or may be used independently. The implementation principles of being used independently and being used in conjunction with the foregoing examples are similar. In the implementations of the present disclosure, some examples are described in terms of a shared implementation, which, of course, as those skilled in the art can understand, do not intend to limit the examples of the present disclosure.

Based on the same concept, the examples of the present disclosure also provide a beam measurement apparatus.

It can be understood that the beam measurement apparatus provided in the examples of the present disclosure includes hardware structures and/or software modules corresponding to the execution of each function in order to achieve the above functions. Through combining with the units and the algorithm steps of each example disclosed in the examples of the present disclosure, the examples of the present disclosure can be implemented in the form of hardware or a combination of hardware and computer software. Whether a certain function is performed in hardware or in a way that the computer software drives the hardware depends on various specific applications and design constraints of the technical solution. Those skilled in the art may use different approaches to implement the described function for each specific application, which should not be considered beyond the scope of the technical solutions provided by the examples of the present disclosure.

Figure 11:
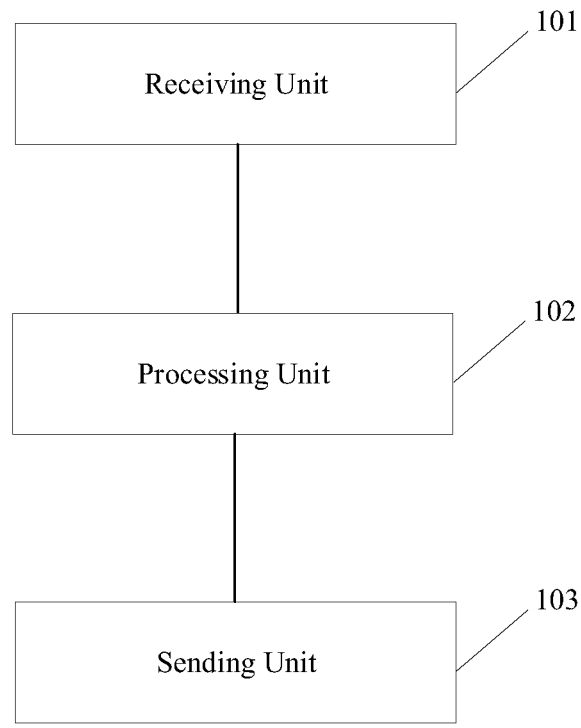
FIG. 11 illustrates a block diagram of a beam measurement apparatus according to an example.

FIG. 11 illustrates a block diagram of a beam measurement apparatus 100 according to an example. By referring to FIG. 11, a beam measurement apparatus 100 is applied to a terminal and includes a receiving unit 101, a processing unit 102, and a sending unit 103.

The receiving unit 101 is configured to receive first configuration information sent by a network device. The first configuration information is used to configure a first reference signal resource set, and the first reference signal resource set includes a first number of reference signal resources for a beam measurement.

The processing unit 102 is configured to perform the beam measurement on the first number of reference signal resources separately, and input a first number of reference signal resource measurement results that are measured and obtained into a first model to obtain a second number of reference signal resource measurement results. The second number is greater than or equal to the first number.

The sending unit 103 is configured to send a measurement report including a third number of reference signal resource measurement results to the network device. The third number of reference signal resource measurement results are a subset of the second number of reference signal resource measurement results.

In an implementation, the third number of reference signal resource measurement results are selected from the second number of reference signal resource measurement results according to signal strengths corresponding to measurement results in a descending order.

In an implementation, the receiving unit 101 is further configured to receive second configuration information sent by the network device. The second configuration information is used to configure a second reference signal resource set, and the second reference signal resource set includes a fourth number of reference signal resources for the beam measurement.

In an implementation, the processing unit 102 is further configured to determine N reference signal resource sets. Where one or more of the N reference signal resource sets include a fifth number of reference signal resources. The processing unit 102 then sends information corresponding to the reference signal resources included in each of the N reference signal resource sets to the network device. Here, N is a positive integer.

In an implementation, the N reference signal resource sets are used to determine the first reference signal resource set in the first configuration information.

In an implementation, the first reference signal resource set is a subset of at least one of the N reference signal resource sets.

In an implementation, the first model is determined in the following way: performing the beam measurement on the fourth number of reference signal resources in the second reference signal resource set separately, and obtaining the first model based on a fourth number of reference signal resource measurement results that are measured and obtained.

In an implementation, the first model is obtained from at least one of: the network device; a cloud device; or a terminal device different from the terminal device.

In an implementation, one or more reference signal resource sets with a smallest number of reference signal resources among the N reference signal resource sets include the fifth number of reference signal resources. The fifth number meets a condition that reference signal resource measurement results of the second number obtained by inputting a fifth number of reference signal resource measurement results into the first model have a precision greater than or equal to a first precision threshold.

In an implementation, the fifth number of reference signal resources are determined in at least one of the following ways: being determined based on the precision of reference signal resource measurement results outputted by the first model; being determined based on configuration information sent by the network device; or being determined based on a definition of a protocol.

In an implementation, the N reference signal resource sets are subsets of the second reference signal resource set.

In an implementation, the receiving unit 101 is further configured to receive the reference signal resources in the second reference signal resource set sent by the network device, and determine the N reference signal resource sets based on the received reference signal resources in the second reference signal resource set.

In an implementation, the receiving unit 101 receives the reference signal resources in the second reference signal resource set that are periodically sent by the network device within sending periods of the first reference signal resource set.

In an implementation, the fourth number is identical with the second number, and the reference signal resource measurement results of the second number correspond to various reference signal resources in the second reference signal resource set, respectively.

Figure 12:
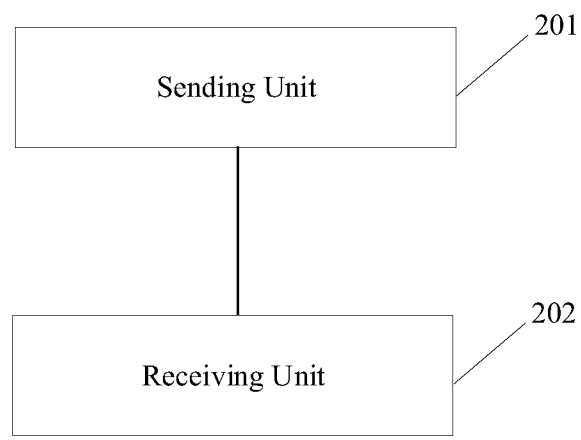
FIG. 12 illustrates a block diagram of a beam measurement apparatus according to an example.

FIG. 12 illustrates a block diagram of a beam measurement apparatus 200 according to an example. By referring to FIG. 12, the beam measurement apparatus 200 is applied to a network device and includes a sending unit 201 and a receiving unit 202.

The sending unit 201 is configured to send first configuration information. The first configuration information is used to configure a first reference signal resource set, and the first reference signal resource set includes a first number of reference signal resources for a beam measurement.

The receiving unit 202 is configured to receive a measurement report from a terminal. The measurement report includes a third number of reference signal resource measurement results. The third number of reference signal resource measurement results are a subset of a second number of reference signal resource measurement results.

The second number is greater than or equal to the first number, and the first number indicates the number of the reference signal resources in the first reference signal resource set.

The second number of reference signal resource measurement results are obtained by performing by the terminal the beam measurement on the first number of reference signal resources separately and inputting a first number of reference signal resource measurement results that are measured and obtained into a first model. The second number is greater than or equal to the first number.

In an implementation, the third number of reference signal resource measurement results are selected from the second number of reference signal resource measurement results according to signal strengths corresponding to measurement results in a descending order.

In an implementation, the sending unit 201 is further configured to send second configuration information. The second configuration information is used to configure a second reference signal resource set, and the second reference signal resource set includes a fourth number of reference signal resources for the beam measurement.

In an implementation, the receiving unit 202 is further configured to receive information corresponding to reference signal resources included in each of N reference signal resource sets from the terminal. One or more of the N reference signal resource sets include a fifth number of reference signal resources and N is a positive integer.

In an implementation, the N reference signal resource sets are used to determine the first reference signal resource set in the first configuration information.

In an implementation, the first reference signal resource set is a subset of at least one of the N reference signal resource sets.

In an implementation, the first model is obtained based on a fourth number of reference signal resource measurement results that are measured and obtained by performing by the terminal the beam measurement on the fourth number of reference signal resources in the second reference signal resource set separately.

In an implementation, the first model is obtained from at least one of: the network device; a cloud device; or a terminal device different from the terminal device.

In an implementation, one or more reference signal resource sets with a smallest number of reference signal resources among the N reference signal resource sets include the fifth number of reference signal resources. The fifth number meets a condition that the reference signal resource measurement results of the second number obtained by inputting a fifth number of reference signal resource measurement results into the first model have a precision greater than or equal to a first precision threshold.

In an implementation, the fifth number of reference signal resources are determined in at least one of the following ways: being determined based on the precision of reference signal resource measurement results outputted by the first model; being determined based on configuration information sent by the network device; or being determined based on a definition of a protocol.

In an implementation, the N reference signal resource sets are subsets of the second reference signal resource set.

In an implementation, the sending unit 201 sends the reference signal resources in the second reference signal resource set.

In an implementation, the sending unit 201 periodically sends periodically the reference signal resources in the second reference signal resource set within sending periods of the first reference signal resource set.

In an implementation, the fourth number is identical with the second number, and the reference signal resource measurement results of the second number correspond to various reference signal resources in the second reference signal resource set, respectively.

With respect to the apparatuses in the foregoing examples, the specific manner in which each module performs its operation has been described in detail in the examples of the related methods, and will not be further elaborated here.

Figure 13:
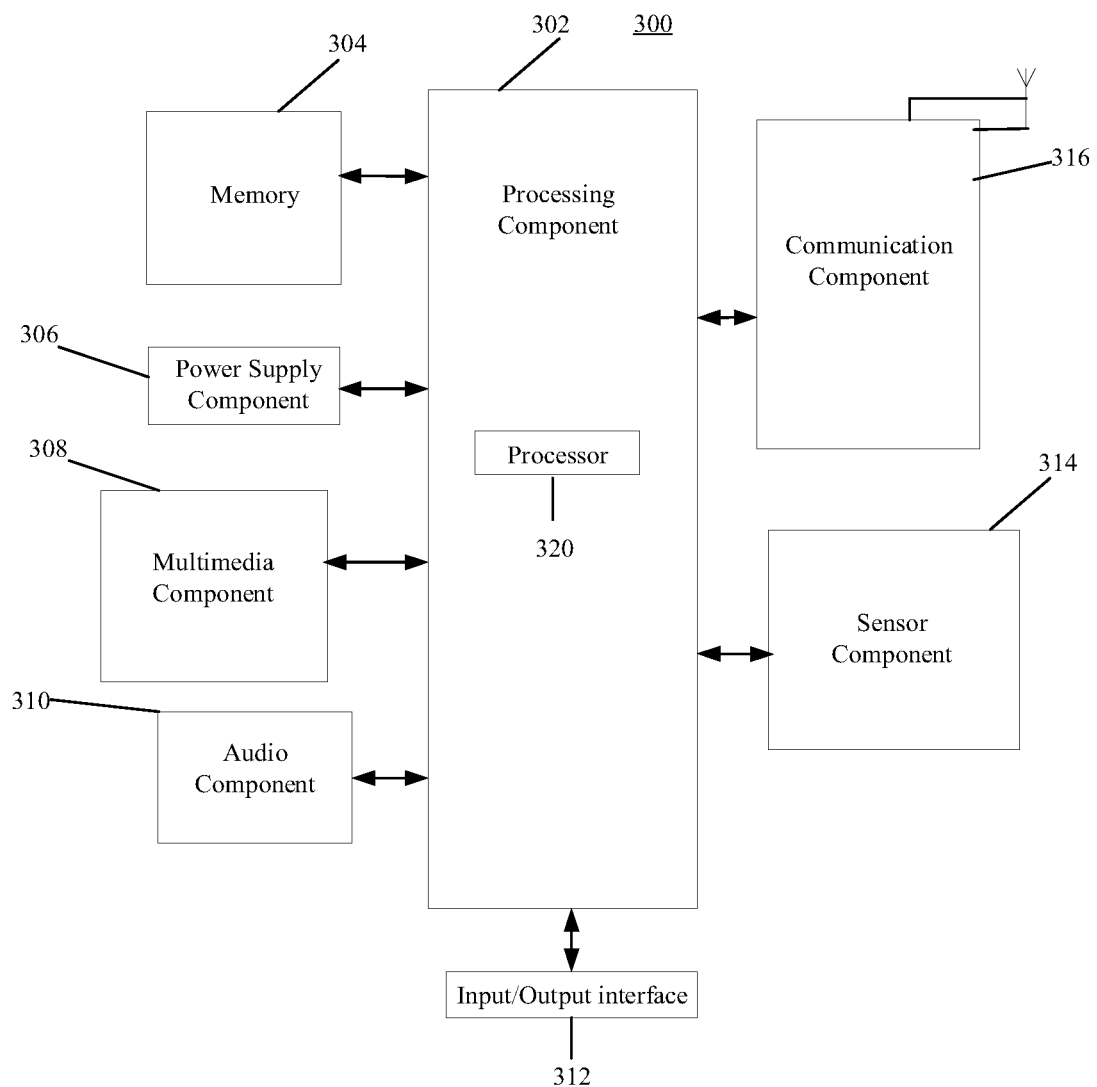
FIG. 13 illustrates a block diagram of an apparatus for beam measurement according to an example.

FIG. 13 illustrates a block diagram of an apparatus for beam measurement 300 according to an example. For example, the apparatus 300 may be a mobile phone, a computer, a digital broadcasting terminal, a messaging device, a game console, a tablet device, a medical device, a fitness device, a personal digital assistant, and the like.

By referring to FIG. 13, the apparatus 300 may include one or more of the following components: a processing component 302, a memory 304, a power supply component 306, a multimedia component 308, an audio component 310, an input/output (I/O) interface 312, a sensor component 314, and a communication component 316.

The processing component 302 generally controls the overall operations of the apparatus 300, such as operations associated with display, phone calls, data communications, camera operations, and recording operations. The processing component 302 may include one or more processors 320 to execute instructions to complete all or a part of the steps of the above methods. In addition, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operations of the apparatus 300. Examples of such data include instructions for any application or method operated on the apparatus 300, contact data, phonebook data, messages, pictures, videos, and the like. The memory 304 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power supply component 306 provides power for various components of the apparatus 300. The power supply component 306 may include a power management system, one or more power supplies, and other components associated with generating, managing, and distributing power for the apparatus 300.

The multimedia component 308 includes a screen providing an output interface between the apparatus 300 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 308 includes a front camera and/or a rear camera. The front camera and/or rear camera may receive external multimedia data when the apparatus 300 is in an operating mode, such as a photographing mode or a video mode. Each front camera and each rear camera may be a fixed optical lens system or have focal length and optical zooming capability.

The audio component 310 is configured to output and/or input an audio signal. For example, the audio component 310 includes a microphone (MIC) that is configured to receive an external audio signal when the apparatus 300 is in an operating mode, such as a call mode, a recording mode, and a voice recognition mode. The received audio signal may be further stored in memory 304 or transmitted via communication component 316. In some examples, the audio component 310 also includes a speaker for outputting an audio signal.

The I/O interface 312 provides an interface between the processing component 302 and a peripheral interface module. The above peripheral interface module may be a keyboard, a click wheel, buttons, or the like. These buttons may include but not limited to a home button, a volume button, a start button and a lock button.

The sensor component 314 includes one or more sensors to provide the apparatus 300 with status assessments in various aspects. For example, the sensor component 314 may detect an open/closed state of the apparatus 300 and a relative positioning of components such as the display and keypad of the apparatus 300, and the sensor component 314 can also detect a change in position of the apparatus 300 or a component of the apparatus 300, the presence or absence of user contact with the apparatus 300, orientation or acceleration/deceleration of the apparatus 300, and temperature change of the apparatus 300. The sensor component 314 may include a proximity sensor configured to detect the presence of a nearby object without any physical contact. The sensor component 314 may further include an optical sensor, such as a Complementary Metal-Oxide-Semiconductor (CMOS) or Charged Coupled Device (CCD) image sensor, for being applied in imaging applications. In some examples, the sensor component 314 may also include an acceleration sensor, a gyro sensor, a magnetic sensor, a pressure sensor, or a temperature sensor.

The communication component 316 is configured to facilitate wired or wireless communication between the apparatus 300 and other devices. The apparatus 300 may access a wireless network based on a communication standard, such as Wi-Fi, 2G, 3G, 4G LTE, 5G NR, or a combination thereof. In an example, the communication component 316 receives broadcast signals or broadcast related information from an external broadcast management system via a broadcast channel. In an example, the communication component 316 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In one or more examples, the apparatus 300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above methods.

In one or more examples, there is also provided a non-transitory computer-readable storage medium including instructions, such as the memory 304 including instructions. These instructions may be executed by the one or more processors 320 of the apparatus 300 to complete the above methods. For example, the non-transitory computer-readable storage medium may be a read-only memory (ROM), a random access memory (RAM), a CD-ROM, a magnetic tape, a floppy disk, an optical data storage device, and the like.

Figure 14:
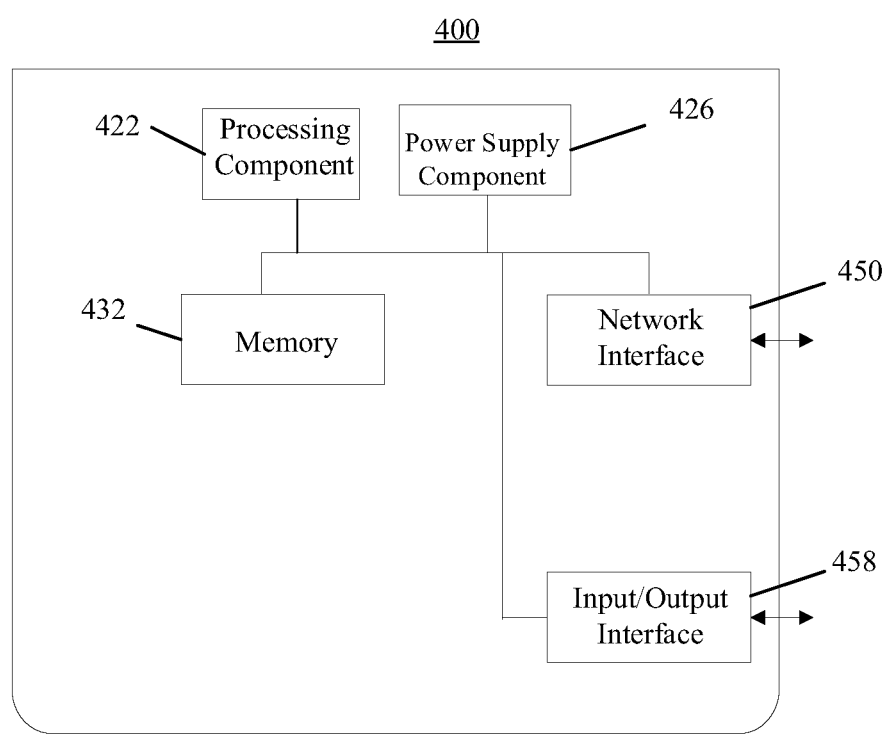
FIG. 14 illustrates a block diagram of an apparatus for beam measurement according to an example.

FIG. 14 illustrates a block diagram of an apparatus for beam measurement 400 according to an example. The apparatus 400 may be provided as a network device. By referring to FIG. 14, the apparatus 400 includes a processing component 422 which further includes one or more processors (not shown), and a memory resource represented by a memory 432 which is used to store instructions that may be executed by the processing component 422, such as application programs. The application programs stored in the memory 432 may include one or more modules, each of which corresponds to a set of instructions. In addition, the processing component 422 is configured to execute the instructions to perform the above methods.

The apparatus 400 may also include a power supply component 426 configured to perform power management of the apparatus 400, a wired or wireless network interface 450 configured to connect the apparatus 400 to a network, and an input/output (I/O) interface 458. The apparatus 400 may operate an operating system stored in the memory 432, which is based on Windows Server, Mac OS X™, Unix™, Linux™, FreeBSD™ or the like.

In an example, there is also provided a non-transitory computer-readable storage medium including instructions, such as the memory 432 including instructions. These instructions may be executed by the processing component 422 of the apparatus 400 to complete the above methods. For example, the non-transitory computer-readable storage medium may be an ROM, an RAM, a CD-ROM, a magnetic tape, a floppy disk, an optical data storage device, and the like.

The technical solutions provided by the examples of the present disclosure may achieve the following beneficial effects. First configuration information that is sent by a network device and include a first number of reference signal resources is received, a second number of reference signal resource measurement results are obtained by inputting a first number of reference signal resource measurement results into a first model, and a measurement report including a third number of reference signal resource measurement results is sent to the network device. The second number is greater than or equal to the first number, and the third number of reference signal resource measurement results are a subset of the second number of reference signal resource measurement results. Therefore, according to the present disclosure, it can lower the signaling overhead for the beam measurement on the reference signal resources and reduce the complexity and power consumption of the terminal measurement while ensuring the accuracy of the beam measurement.

It can be further understood that the term "plurality" in the present disclosure refers to two or more than two, and other quantifiers are similar. The term "and/or" describes the association relationships between associated objects, indicating that there can be three types of relationships. For example, A and/or B means that A exists alone, A and B exist at the same time, and B exists alone. The character "/" generally indicates that the associated objects before and after are in an "or" relationship. The singular forms "a", "said" and "the" are also intended to include plurality, unless clearly indicated otherwise in the context.

It can be further understood that the terms "first", "second", etc. are used to describe various information, but such information should not be limited to these terms. These terms are only used to distinguish information of the same category with each other, without indicating a specific order or an important degree. In fact, the expressions such as "first" and "second" may be used interchangeably. For example, without departing from the scope of the present disclosure, first information may be referred as second information; and similarly, second information may also be referred as first information.

It can be further understood that although being described in a specific order in the drawings, the operations in the examples of the present disclosure should not be understood as requiring these operations to be performed in the specific order shown or in a serial order, or requiring the operations to be completely performed as shown to get a desired result. In certain circumstances, multitasking and parallel processing may be advantageous.

Other implementations of the present disclosure will be readily apparent to those skilled in the art after implementing the disclosure by referring to the description. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above-described accurate structures illustrated in the drawings, and various modifications and changes can be made to the present disclosure without departing from the scope thereof. The scope of the present disclosure is to be limited only by the appended claims.

The invention claimed is:

1. A beam measurement method, performed by a terminal device, comprising:
   receiving first configuration information sent by a network device, wherein the first configuration information is used to configure a first reference signal resource set, and the first reference signal resource set comprises a first number of reference signal resources for a beam measurement;
   performing the beam measurement on each of the first number of reference signal resources separately;
   inputting a first number of reference signal resource measurement results that are measured and obtained into a first model to obtain a second number of reference signal resource measurement results, wherein the second number is greater than or equal to the first number; and
   sending a measurement report comprising a third number of reference signal resource measurement results to the network device, wherein the third number of reference signal resource measurement results are a subset of the second number of reference signal resource measurement results.

2. The beam measurement method according to claim 1, wherein the third number of reference signal resource measurement results are selected from the second number of reference signal resource measurement results according to signal strengths corresponding to measurement results in a descending order.

3. The beam measurement method according to claim 1, further comprising:
   receiving second configuration information sent by the network device,
   wherein the second configuration information is used to configure a second reference signal resource set, and the second reference signal resource set comprises a fourth number of reference signal resources for the beam measurement.

4. The beam measurement method according to claim 3, further comprising:
   determining N reference signal resource sets; and
   sending information corresponding to the reference signal resources comprised in each of the N reference signal resource sets to the network device,
   wherein N is a positive integer,
   wherein the N reference signal resource sets are used to determine the first reference signal resource set in the first configuration information,
   wherein one or more reference signal resource sets with a smallest number of reference signal resources among the N reference signal resource sets comprise a fifth number of reference signal resources,
   wherein the fifth number meets a condition that reference signal resource measurement results of the second number obtained by inputting a fifth number of reference signal resource measurement results into the first model have a precision greater than or equal to a first precision threshold, and
   wherein the first reference signal resource set is a subset of at least one of the N reference signal resource sets.

5. The beam measurement method according to claim 3, wherein the first model is determined by:
   performing the beam measurement on each of the fourth number of reference signal resources in the second reference signal resource set separately, and
   obtaining the first model based on a fourth number of reference signal resource measurement results that are measured and obtained.

6. The beam measurement method according to claim 1, wherein the first model is obtained from at least one of:
   the network device;
   at least one cloud devices; or
   a terminal device different from the terminal device.

7. The beam measurement method according to claim 4, wherein the fifth number of reference signal resources are determined based on at least one of:
   the precision of reference signal resource measurement results outputted by the first model;
   third configuration information sent by the network device; or
   a definition of a protocol.

8. The beam measurement method according to claim 4, wherein
   the N reference signal resource sets are subsets of the second reference signal resource set; and
   the beam measurement method further comprises:

receiving the reference signal resources in the second reference signal resource set sent by the network device, which comprises receiving the reference signal resources in the second reference signal resource set that are periodically sent by the network device within sending periods of the first reference signal resource set; and determining the N reference signal resource sets based on the reference signal resources.

9. The beam measurement method according to claim 3, wherein the fourth number is identical with the second number, and reference signal resource measurement results of the second number correspond to various reference signal resources in the second reference signal resource set, respectively.

10. A beam measurement method, performed by a network device, comprising:

sending first configuration information, wherein the first configuration information is used to configure a first reference signal resource set, and the first reference signal resource set comprises a first number of reference signal resources for a beam measurement; and receiving a measurement report from a terminal device, wherein the measurement report comprises a third number of reference signal resource measurement results, and the third number of reference signal resource measurement results are a subset of a second number of reference signal resource measurement results;

wherein the terminal device performs the beam measurement on each of the first number of reference signal resources separately;

wherein the second number of reference signal resource measurement results are obtained using a model on the terminal device; and wherein the second number is greater than or equal to the first number, and the first number indicates the number of the reference signal resources in the first reference signal resource set.

11. The beam measurement method according to claim 10, wherein the third number of reference signal resource measurement results are selected from the second number of reference signal resource measurement results according to signal strengths corresponding to measurement results in a descending order.

12. The beam measurement method according to claim 10, further comprising:

sending second configuration information, wherein the second configuration information is used to configure a second reference signal resource set, and the second reference signal resource set comprises a fourth number of reference signal resources for the beam measurement.

13. The beam measurement method according to claim 12, further comprising:

receiving information corresponding to reference signal resources comprised in each of N reference signal resource sets from the terminal device, wherein N is a positive integer:

wherein the N reference signal resource sets are used to determine the first reference signal resource set in the first configuration information, wherein one or more reference signal resource sets with a smallest number of reference signal resources among the N reference signal resource sets comprise a fifth number of reference signal resources, wherein the fifth number meets a condition that reference signal resource measurement results of the second number obtained by inputting a fifth number of reference signal resource measurement results into the first model have a precision greater than or equal to a first precision threshold, and wherein the first reference signal resource set is a subset of at least one of the N reference signal resource sets.

14. The beam measurement method according to claim 13, wherein the fifth number of reference signal resources are determined based on at least one of:

the precision of reference signal resource measurement results outputted by the first model;

third configuration information sent by the network device; or a definition of a protocol.

15. The beam measurement method according to claim 13, wherein the N reference signal resource sets are subsets of the second reference signal resource set;

wherein sending the second configuration information comprises:

sending the reference signal resources in the second reference signal resource set, which comprises:

sending periodically the reference signal resources in the second reference signal resource set within sending periods of the first reference signal resource set.

16. The beam measurement method according to claim 12, wherein the fourth number is identical with the second number, and reference signal resource measurement results of the second number correspond to various reference signal resources in the second reference signal resource set, respectively.

17. A beam measurement apparatus, comprising:

one or more processors; and one or more memories for storing instructions executable by the one or more processors;

wherein the one or more processors are configured to perform:

receiving first configuration information sent by a network device, wherein the first configuration information is used to configure a first reference signal resource set, and the first reference signal resource set comprises a first number of reference signal resources for a beam measurement;

performing the beam measurement on each of the first number of reference signal resources separately;

inputting a first number of reference signal resource measurement results that are measured and obtained into a first model to obtain a second number of reference signal resource measurement results, wherein the second number is greater than or equal to the first number; and sending a measurement report comprising a third number of reference signal resource measurement results to the network device, wherein the third number of reference signal resource measurement results are a subset of the second number of reference signal resource measurement results.

18. A beam measurement apparatus, comprising:

one or more processors; and one or more memories for storing instructions executable by the one or more processors;

wherein the one or more processors are configured to perform the beam measurement method according to claim 15.

19. A non-transitory computer-readable storage medium for storing instructions, wherein the instructions, when executed by one or more processors, enable a terminal device to perform the beam measurement method according to claim 1.

20. A non-transitory computer-readable storage medium for storing instructions, wherein the instructions, when executed by one or more processors, enable a network device to perform the beam measurement method according to claim 15.

* * * * *